Oct. 22, 1968   J. J. LOCKSHAW   3,407,101
METHOD OF MAKING REINFORCED PLASTIC PIPE
Filed June 7, 1965   2 Sheets-Sheet 1
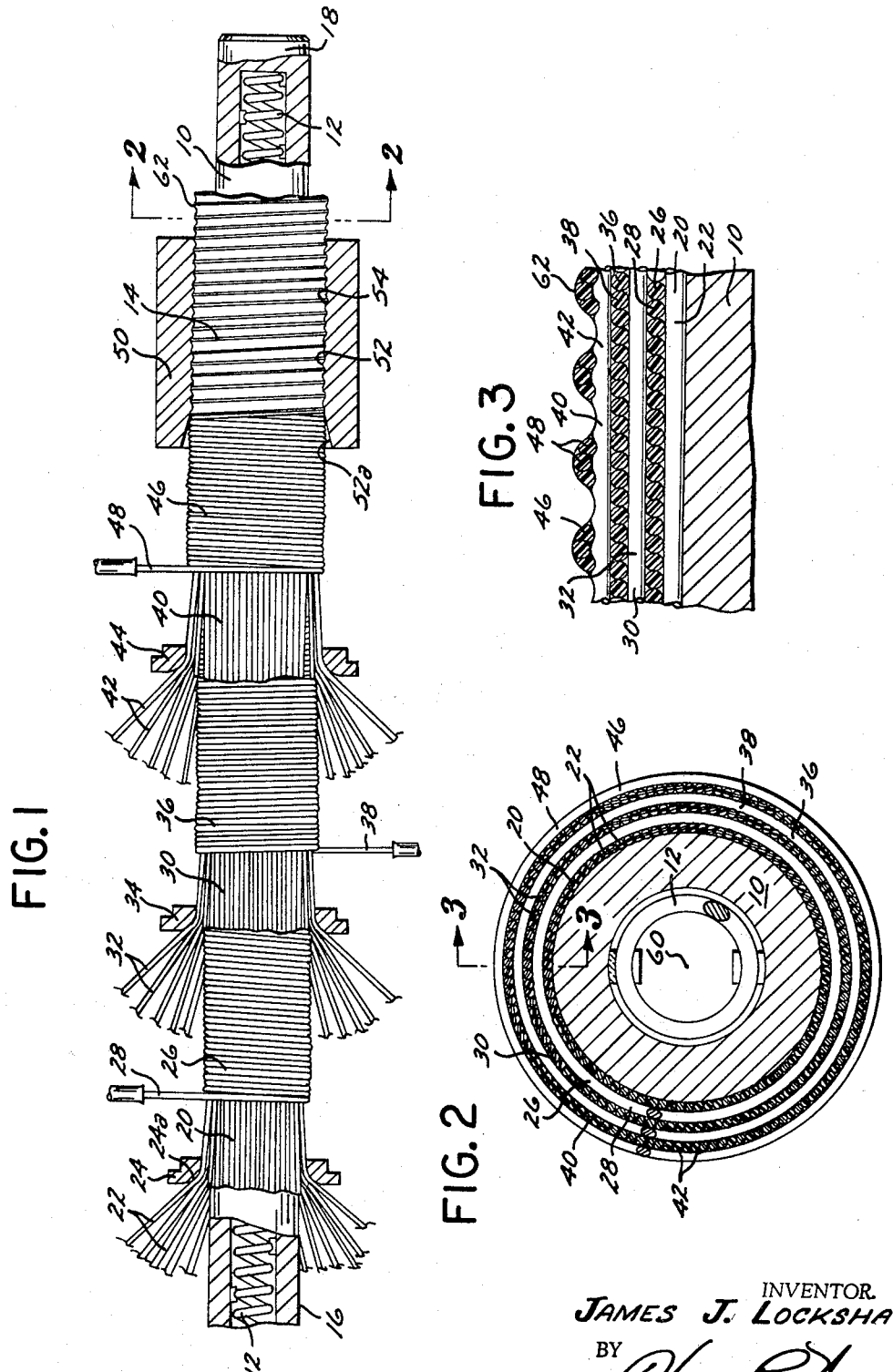
INVENTOR.
JAMES J. LOCKSHAW
BY
ATTORNEY Oct. 22, 1968  J. J. LOCKSHAW  3,407,101
METHOD OF MAKING REINFORCED PLASTIC PIPE
Filed June 7, 1965  2 Sheets-Sheet 2

INVENTOR.
JAMES J. LOCKSHAW
BY
*Harry C. Hieurs.*
ATTORNEY 3,407,101
METHOD OF MAKING REINFORCED
PLASTIC PIPE
James J. Lockshaw, 2882 W. Rome,
Anaheim, Calif. 92804
Filed June 7, 1965, Ser. No. 461,989
6 Claims. (Cl. 156—175)

ABSTRACT OF THE DISCLOSURE

This invention pertains to the method of forming threaded plastic pipe whereby successive layers of angularly disposed glass fibers are wrapped about a mandrel, emersed in resin and permitted to form a firm rigid pipe. It is characterized by having fastening threads formed therein by relocation of the external layer of glass fibers into the form of a helix.

---

The present invention relates generally to reinforced plastic pipe and to methods of making same, and more particularly to pipe which is formed of reinforcing glass fibers.

Within recent past years, the use of plastic pipe of virtually all sizes has become very popular. For some applications, such pipe is preferable to pipe formed of iron, steel or substantially any other material, due to the fact that the ingredients of plastic materials are relatively inert. Many such ingredients, such as reinforcing glass fibers and bonding resins are impervious to many different chemicals. Quite obviously, this characteristic enables plastic pipe to be used to advantage for transporting chemicals such as oils, gas and other hydrocarbons and, to be used as soil pipe for sewage systems.

The exceptionally high strength of plastic materials makes such pipes particularly desirable where heavy loads are encountered, and where the weight and size of the pipe structure become important. For instance, where pipe is used in sewage systems, it must be laid for considerable distances. Thus, the matter of transporting the pipe becomes a significant factor. That is, the cost of transporting such pipe from a given location to the various points of assembly is frequently appreciable. The steel or concrete pipes heretofore used for such purposes are extremely heavy and hence transportation of these items can become very expensive.

It has been found that considerably greater footage or usable length of reinforced plastic pipe can be transported in a given truck or other vehicle primarily because of its exceptionally high strength to weight ratio. That is, pipe made of reinforced plastic is relatively strong compared to its size and weight, thereby permitting more lengths of such pipe to be transported in a given vehicle as compared to the much heavier and bigger steel or concrete pipe.

Plastic pipe heretofore manufactured has comprised relatively large sheets of plastic material or cloth wound about a mandrel and impregnated with bonding resin. Such method of manufacture has limited the length of such prior pipe to the length of the mandrel employed. Also, the strength of such prior plastic pipe has been less than optimum due to the use of relatively large sheets of plastic cloth.

Also, prior plastic pipe has necessitated special equipment and tools for attaching adjacent ends of contiguously arranged sections of pipe. Special threading dies and taps as well as special pipe fittings have been required to enable workmen to threadedly fasten several sections of pipe together. In this regard, pipe nipples have been provided having internal fastening threads for engagement with externally threaded adjacent ends of contiguously arranged pipe sections.

In the alternative, such prior plastic pipe has necessitated special bonding agents for firmly securing the nipples and pipe ends together. That is, under certain circumstances, rather than employing fastening threads for connecting the various pipe sections together, the pipe nipples and pipes have been telescopically connected and a bonding agent has been applied therebetween to effect the necessary mechanical or hermetic seal.

It is an object of the present invention to teach the construction of and the method of making reinforced plastic pipe which is exceptionally strong as evidenced by a relatively high strength to weight ratio.

Another object of the present invention is to provide plastic pipe as characterized above which is formed of a plurality of glass fibers arranged substantially at right angles and which are bonded together by a suitable plastic resin.

Another object of the present invention is to provide reinforced plastic pipe as characterized above which is provided with fastening means throughout its entire length for use in interconnecting several sections of such pipe.

A still further object of the present invention is to provide reinforced plastic pipe as characterized above which is simple and inexpensive to manufacture and which is rugged and dependable in use.

Another object of the present invention is to teach the method of manufacture of reinforced plastic pipe whereby pipe of substantially any desired length can be formed.

Another object of the present invention is to teach the method of manufacture of reinforced plastic pipe as characterized above wherein the length of pipe is not in any way limited by the length of the mandrel or other machine parts employed.

A further object of the present invention is to teach a method of manufacture of reinforced plastic pipe wherein fastening threads are substantially automatically formed throughout the entire length of the pipe.

A still further object of the present invention is to provide a method of manufacture of reinforced plastic pipe as characterized above for making plastic pipe which is exceptionally durable and is provided with a high strength to weight ratio.

The novel features which I consider characteristic of my invention are set forth with particularity in the appended claims. The device itself, however, both as to its organization and mode of operation, together with additional objects and advantages thereof, will best be understood from the following descriptions of specific embodiments when read in connection with the accompanying drawings, in which:

FIGURE 1 is a side elevational view partly in section, of a mandrel whereon reinforced plastic pipe is being formed according to the present invention;

FIGURE 2 is a transversed sectional view taken substantially along line 2—2 of FIGURE 1 of the drawings;

FIGURE 3 is a fragmentary sectional view taken substantially along line 3—3 of FIGURE 2 of the drawings;

Like reference characters indicate corresponding parts throughout the several views of the drawings.

Figure 4:
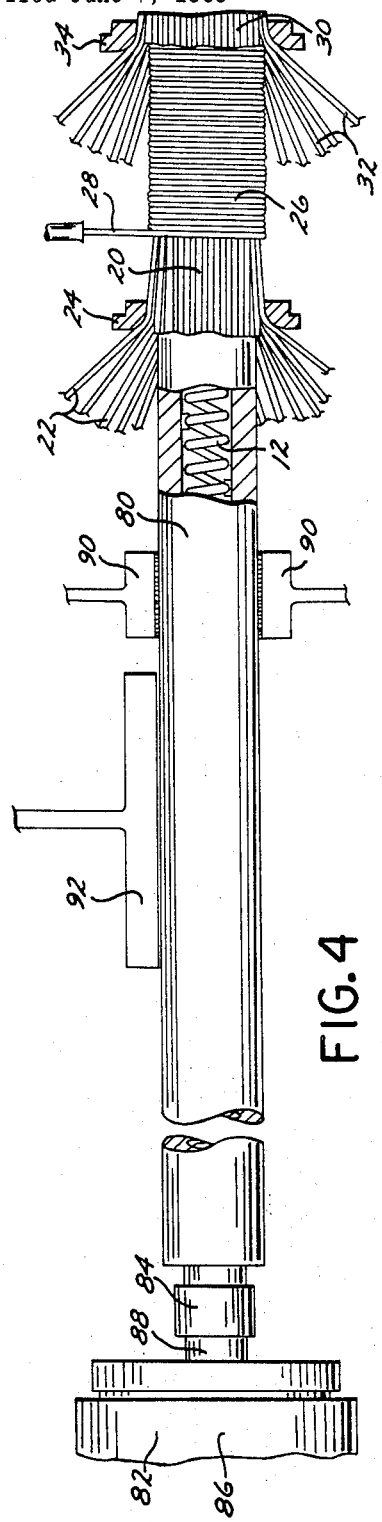
FIGURE 4 is a side elevational view of apparatus for making reinforced plastic pipe according to a second method.

Referring to FIGURE 1 of the drawings, there is shown therein a section of reinforced plastic pipe according to the present invention being formed in accordance with a first method of manufacture also taught by the present invention. The construction of such pipe is believed to be evident from the method of manufacture, and hence such method will be described in detail.

There is shown in FIGURE 1, a mandrel 10 of substantially any appropriate length and diameter. Such mandrel is preferably generally cylindrical in construction and is provided with a diameter corresponding to the internal diameter of the reinforced plastic pipe to be formed. That is, in the event it is desired to form plastic pipe having a two inch (2") internal diameter, a mandrel 10 having a two inch (2") outer diameter is employed.

Associated with or embedded in mandrel 10 is heat means such as an electrorespective heating coil 12 to be connected to a suitable source (not shown) of electric power. Coil 12, as will hereinafter become more apparent, heats mandrel 10 to cause it to perform a necessary step in the method of making reinforced plastic pipe in accordance with the present invention. However, as will hereinafter be readily apparent to those persons skilled in the art, coil 12 may also be associated with any appropriate automatic or manual control means such as a switch for alternatively connecting and disconnecting said coil with the source of electric power. Also, such coil may be associated with thermostatically-controlled switch means whereby the temperature of mandrel 10 is maintained at a substantially constant temperature.

Mandrel 10 is stationary and may be supported in any one of a number of ways. The size of the plastic pipe to be formed thereon is not limited to the length of such mandrel as is the case in prior art methods and devices. As viewed in FIGURE 1 of the drawings, the plastic pipe 14 is formed on mandrel 10 as it moves from end portion 16 toward end portion 18 thereof.

Due to such movement, which will hereinafter be described in detail, mandrel 10 is preferably supported in cantilever fashion at end portion 16. Thus, the end portion 18 remains free and open for easy and direct removal of the completely formed plastic pipe 14.

Mandrel 10 need only be long enough to enable certain functions to be performed along its length. That is, as will hereinafter be described in detail, there are certain functions or processes which are to be performed on and about the mandrel. To this extent, the mandrel must have sufficient length to enable such functions to be performed thereon. However, one of the distinct features of the present invention is that the length of pipe to be made is in no way related to the length of the mandrel employed.

The first step in making plastic pipe according to the first method of the present invention, is to provide a first roving of glass fibers in adjacent relation along the circumference of the cylindrical mandrel 10, and in generally parallel relation to the axis thereof. Such roving is generally shown at 20 and comprises a plurality of glass fibers 22 arranged longitudinally of the mandrel.

Any appropriate fixtures (not shown) for retaining individual spools or other containers (also not shown) of glass fiber strands may be employed and may be suitably positioned for providing the glass fibers at the end portion 16 of mandrel 10. It is contemplated that the forward ends of such glass fiber strands 22 be fastened to a collecting ring or annulus (not shown) which fits about the mandrel 10 and moves therealong from one end to the other.

A stationary collar 24 having an annular arcuate portion 24a is provided about the mandrel 10 to urge the glass fibers to a position adjacent the mandrel as the collecting ring (not shown) moves towards end portion 18.

Thus, the first roving 20 to be positioned adjacent mandrel 10 consists of a plurality of glass fibers arranged in side by side relation along the circumference of the mandrel and parallel thereto.

The next step in the first method of making the subject reinforced plastic pipe is to provide a second roving 26 on the first roving 20, the second roving consisting of one or more substantially continuous glass fiber strands 28 wound about the first roving. The strand 28 is thus provided in successive adjacent convolutions about the first roving to provide segments of glass fibers in the second roving at substantially right angles to the glass fibers of the first roving. Such arrangement is particularly important in the making of reinforced plastic pipe which is exceptionally strong, although of a relatively small size. That is, this particular feature is necessary to make a reinforced plastic pipe having a relatively high strength to weight ratio.

To provide the second roving 26 a suitable source (not shown) of a substantially continuously strand of glass fibers is rotatably mounted adjacent the mandrel. An appropriate bobbin is employed to wind the glass fiber strand about the mandrel after the forward ends of such strands are attached to the first roving to provide the second roving 26.

The next step in the making of the plastic pipe according to the first method is to provide a third roving 30 similar to or identical with the aforementioned first roving 20. Such third roving 30 comprises a plurality of glass fibers 32 arranged parallel to the axis of the mandrel and adjacent to the second roving 26. A suitable fastening ring (not shown) may be employed for carrying the forward ends of the glass fibers 32 of the third roving, or such forward ends may be attached to the second roving as by gluing or the like.

The fourth roving 36 is similar to the second roving 26. Such fourth roving comprises one or more substantially continuous strands of glass fiber wound about the third roving 30. The forward end of strand 38 is attached to the preceding roving 30 in the same manner that the forward end of strand 28 of the second roving 26 is attached to the first roving 20.

Although for the construction of certain types and sizes of plastic pipe only the above-mentioned four rovings might be necessary, on the other hand, for larger size pipe, additional rovings are necessary as shown at 40 and 46. The first such additional roving, namely the fifth roving, is similar to the first and third rovings and comprises a pluarilty of glass fibers 42 arranged in parrallel relation to the mandrel 10 and are held against the fourth roving by a stationary collar 44.

The sixth roving comprises one or more relatively continuous strands 48 of glass fibers wound tightly about the fifth roving 40.

The entire tubular structure heretofore described is caused to move along the mandrel 10 and is impregnated with suitable plastic resins of the thermosetting synthetic type. These resins are heat hardenable and do not soften under further application of heat. Some such synthetic resins are phenol and urea formaldehyde, melamine, polyvinyl butyl resins and unsaturated ester-styrene copolymers. There are also numerous other resins both synthetic and natural which are adaptable to the present use. However, the precise formulation of such bonding resin is not a limitation to the present invention, it being realized that substantially any and all bonding materials which have the necessary bonding characteristics are usable.

The bonding resin may be applied to the glass fibers and strands in any appropriate manner. For instance, it may be applied to the individual glass fibers prior to positioning thereof along the mandrel 10, an apparatus to accomplish this is well known in the art. In its simplest form, such apparatus comprises a container for retaining the bonding resin and through which the glass fibers are drawn as they are positioned along the mandrel 10.

One of the next steps in the formation of reinforced plastic pipe according to the first method of the present invention is to cause or permit said bonding resin to solidify. That is, such bonding resin, is generally in fluid or highly plasticized form when applied to the indivdual pieces of glass fibers. To provide a unitary structure which is strong and durable, it is necessary for such resin to harden. Such hardening may take place merely by exposure of the material to air, or, if the resin is of the thermosetting type, it may require exposure to heat. By maintaining mandrel 10 at a predetermined temperature, sufficient heat is continuously applied to the glass fibers and resin to cause the latter to solidify or harden quickly. For this reason, the heating coil 12 embedded in the mandrel 10 is energized as described above.

During such setting or solidifying process, the plastic pipe 14 is caused to move through a rotating thread-forming die 50. This die is provided with a bore 52 which is formed with generally sinusoidal thread formations 54, the forward end of bore 52 being tapered, as shown at 52a, to accommodate the forward end of the plastic pipe 14.

Die 50 may be rotated by an appropriate means such as an electric motor having power transmission means such as gears, chains, belts or the like. Such die 50 may be rotatably mounted about the mandrel 10 by means of suitable bearings (not shown).

The rotation of die 50 is coordinated or synchronized with the forward motion of plastic pipe 14 on mandrel 10. The aforementioned collecting ring (not shown) to which the glass fibers 22 of the first roving 20 are attached, should have its linear movement synchronized with the rotation of die 50. Any appropriate interconnecting drive means may be employed to accomplish this. As a result, the die 50 will then form the proper number and shape of threads per inch of lineal length of the pipe.

As will be readily apparent to those persons skilled in the art, the die 50 may be formed with threaded formations 54 within the bore 52 of substantially any desired configuration. That is, any desired number of threads per lineal inch may be provided.

It is thus seen that as the bonding resin is permitted or caused to solidify, the die 50 re-positions the glass fiber strands 48 of the last roving 46 such as to provide sinusoidal threads on the exterior surface of pipe 14. As the pipe leaves the die 50, the bonding resin must be sufficiently set to permit the thread formations on the pipe to remain.

By following the aforedescribed first method of making plastic pipe, it is seen that pipe of substantially any length can be provided at the end portion 18 of mandrel 10. Also, the length of such pipe is not limited by the length of the glass fibers employed therein, since it is a simple matter to join glass fibers together to provide a continuous strand as aforedescribed. Thus, there is virtually no limit to the length of pipe formed by the aforedescribed method.

Having described the first method of making plastic pipe, attention is now directed to FIGURES 2 and 3 which show the pipe structure in further detail.

As seen in FIGURE 2, the rovings 20, 30 and 40 provide a plurality of glass fibers 22, 32 and 42, respectively, parallel to the axis 60 of mandrel 10. Interposed between the rovings 20 and 30 is the roving 26 comprising one or more glass fiber strands 28. In like fashion, the fourth roving 36 is interposed between the third and fifth rovings 30 and 40. Roving 36, of course, comprises one or more glass fiber strands 38. The sixth roving 46 which comprises one or more glass fiber strands 48 is positioned on and about the fifth roving 40, and, as shown in FIGURE 3 of the drawings, is re-arranged to form the sinusoidal fastening threads 62.

The forward end of pipe 14 may be cut off to eliminate or remove the fastening ring to which the glass fibers 22 of the first roving 20 are attached. In fact, as much as required of the forward portion of pipe 14 should be removed to provide a pipe 14 which is of like construction and quality throughout its entire length.

The fact that the successive rovings have glass fibers at right angles to each other creates a very strong structure having a relatively high strength to weight ratio. It is contemplated that appropriate fittings can be used to fasten contiguous sections of plastic pipe 14 together.

Due to the formation of fastening threads throughout the length of the pipe 14, it is a simple matter for the workmen to cut the various plastic pipe sections to proper length merely by the use of an ordinary hand or power saw. By utilizing nipples and other pipe fittings formed with internal fastening threads for mating engagement with the threads 62 of pipe 14, it is a simple matter to connect several of such pipe sections together.

Figure 5:
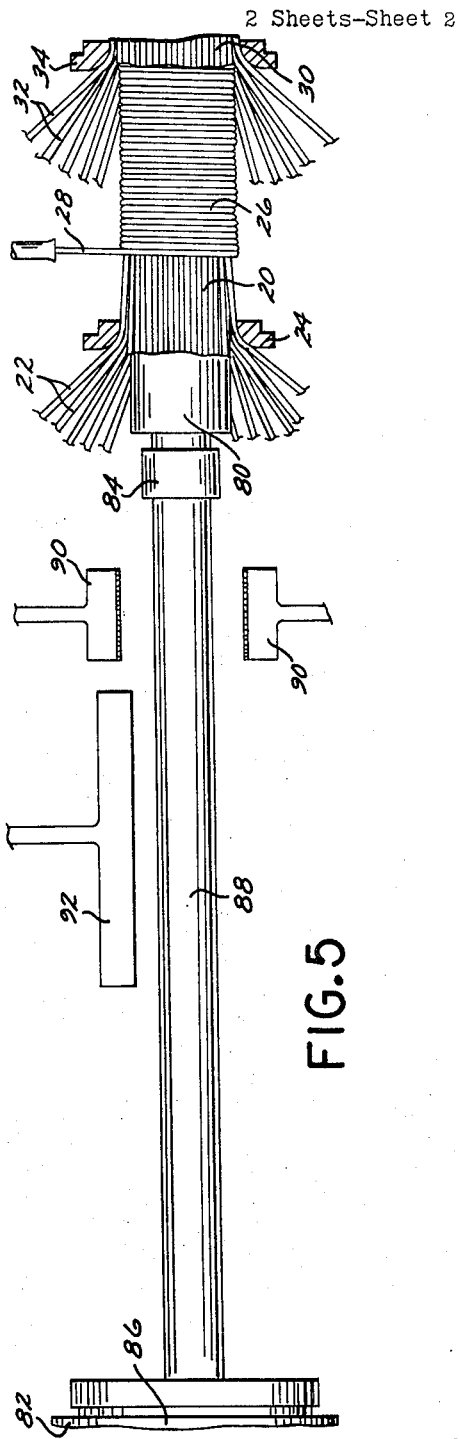
FIGURE 5 is a side elevational view similar to FIG- URE 4, showing an advanced step in the practice of said second method.

Referring to FIGURES 4 and 5 of the drawings which show a second method for making reinforced plastic pipe according to the present invention, it is seen that the same method steps are employed in arranging the rovings of glass fibers on the mandrel. However, the mandrel 80 shown in FIGURES 4 and 5 is afforded reciprocable movement to enable an initial coating of resin to be applied thereto without requiring the continuous plastic pipe to be interrupted.

That is, it has been found that for certain applications, the reinforced plastic pipe should have its internal diameter comprised of a layer of plastic resin of predetermined thickness. The reinforced plastic pipe formed in accordance with the method of FIGURE 1 and hereinabove described comprises a first longitudinal roving 20 of glass fibers which constitute or form the internal surface of the finished pipe. This is shown most clearly in FIGURES 2 and 3 where the first roving 20 is adjacent the mandrel 10.

To insure that the finished reinforced plastic pipe will have an internal surface of plastic resin of predetermined thickness, the method of FIGURES 4 and 5 may be employed.

The mandrel 80 is mounted on any appropriate reciprocating actuator such as a pneumatic or hydraulic actuator 82. A suitable connector 84 may be used to make such mounting connection. The actuator 82 which is partially shown in FIGURES 4 and 5, comprises a stationary cylinder 86 and a movable piston rod 88 which is attached to and carried by a piston (not shown). Thus, by suitable operation of actuator 82, the piston rod 88 and the mandrel 80 attached thereto are caused to have reciprocating movement as will hereinafter appear in greater detail.

A set of retractable applicators 90 is provided adjacent the mandrel 80 near the first roving 20 of glass fibers. Such applicators are operable to apply a parting agent to the surface of the mandrel as the latter is retracted as will hereinafter be explained. The chemical composiiton of such parting agents is well known in the art and are applied to the mandrel to permit of subsequent separation of the plastic resin and the mandrel.

The applicators 90 are operatively connected to the operating means for actuator 82 so that the applicators 90 are in engagement with the mandrel 80 only when the latter is being retracted as will hereinafter be explained. That is, as the mandrel 90 is caused to reciprocate, the parting agent applicators 90 are caused to contact the same only when it is being retracted and to be out of engagement therewith when it is being extended.

Another applicator 92 for applying plastic resin to the mandrel 80, after the parting agent has been applied to the latter, is provided adjacent the applicators 90 as shown in FIGURES 4 and 5. Applicator 92 may take substantially any desired form to apply resin to the circumference of mandrel 80. However, such resin applying means need not be retractable but rather may apply plastic resin to the mandrel 80 throughout both of its reverse movements.

As shown in FIGURES 4 and 5 of the drawings, the second method of making reinforced plastic pipe employs the same steps as previously explained with regard to the first method shown in FIGURES 1, 2 and 3. That is, the same rovings and glass fibers are provided on the mandrel in the same manner, except that the mandrel 80 of FIGURES 4 and 5 has an initial plastic surface.

The actuator 82 shown in FIGURES 4 and 5 must be further coordinated with the means employed for applying the rovings 20, 26, 30, 36, 40 and 46. This is to insure that the mandrel 80 is moved in a forward direction at the precise rate of advance of the rovings thereon. Thus, the mandrel 80 is intended to move forward at the same rate as the reinforced plastic pipe is being formed thereon.

When the mandrel 80 reaches its extreme extended position, as shown in FIGURE 5 of the drawings, suitable switches are actuated to cause the actuator 82 to retract. This causes mandrel 80 to be retracted within the then formed plastic pipe thereon and suitable means may be employed, as desired, to retain the plastic pipe in a fixed position. This will enable the mandrel 80 to be retracted relative to such plastic pipe.

The forward end of mandrel 80 remains within the plastic pipe to support the same while the rearward portion thereof is being coated with plastic resin.

At the commencement of the retraction movement of mandrel 80, applicators 90 are moved inwardly toward the mandrel so as to apply the parting agent thereto. That is, as the mandrel 80 is retracted it first engages the applicators 90 and thus is firstly provided with a coating of a suitable plastic resin parting agent.

Subsequently during its retraction, the mandrel 80 engages the resin coating applicator 92. This provides a coating of plastic resin on the parting agent, the latter of which is already on the mandrel at this time.

It may be found desirable to use rotating means in conjunction with the actuator 82 and connector 84 to rotate the mandrel 80 about its longitudinal axis during its retractive movement. That is, in the event it is desired to employ applicators 90 and 92 which engage only part of the surface of mandrel 80, suitable rotation of mandrel 80 may be provided so as to cause such applicators to wipe the entire surface thereof. This feature, however, is optional in that suitably-formed applicators 90 and 92 may be utilized to cover the entire surface area of the mandrel as it moves back and forth.

After the mandrel 80 has reached its extreme retracted position, the applicators 90 are retracted from their positions of engagement with mandrel 80. The actuator 82 then moves the mandrel forward, the applicators 92 continuing to apply plastic resin thereto as the aforementioned rovings of glass fiber are formed on and about said mandrel.

After the subsequent length of reinforced plastic pipe has been formed on the mandrel 80, the mandrel 80 is retracted and parting agent and plastic resin are applied thereto so that another section of plastic pipe can be formed thereon.

Mandrel 80 is also provided with a heating coil for curing the plastic resin thereon. Thus, as the plastic resin and rovings of glass fiber move forward with the mandrel, the reinforced plastic pipe is cured as above explained with respect to the first method.

The aforedescribed die 50 and its use in providing continuous helical threads on the pipe is also operable in the second method.

The reinforced plastic pipe formed in accordance with the second method is substantially identical to that formed by the first method, except that the internal surface thereof is provided with a plastic coating of predetermined thickness. Other than that, however, the rovings and glass fibers are at right angles to each other as above described with respect to the plastic pipe formed by the first method.

It is thus seen that the present invention provides the construction and the methods of making reinforced plastic pipe which is unusually strong and durable for substantially any application.

Although I have shown and described certain specific embodiments of my invention, I am fully aware that many modifications thereof are possible. My invention, therefore, is not to be restricted except insofar as is necessitated by the prior art and by the spirit of the appended claims.

I claim:
1. The method of making reinforced plastic pipe of substantially any desired length comprising the steps of:
   arranging a plurality of glass fibers in parallel at a first position to form a layer about a central axis and moving such fibers so arranged in unison in the direction of said axis past a second position for application thereto of another layer;
   at said position applying another layer of glass fibers to said plurality of fibers by winding a glass fiber strand about said parallel glass fibers as the latter is moved past said position, such that the combined layers of glass fibers move as a unit in the direction of said axis past a third position;
   applying bonding resin to said glass fibers;
   rearranging the exterior layer of glass fibers in predetermined spaced relation, at said third position, to cause said fibers to form a continuous thread-shaped impression; and
   causing said resin to solidify and fix said thread-shape impression by application of heat to the interior of said combined layers of fibers and resin simultaneously at said first, second and third positions.

2. The invention defined in claim 1 including the additional steps of applying at successive positions intermediate said second and third positions additional layers of glass fibers to the first and second mentioned layers comprising a layer of glass fibers laid parallel and adjacent to one another and parallel to the fibers of said first mentioned layer and another layer formed by a winding of glass fiber strand about said parallel glass fibers, and impregnating said additional layers with bonding resin prior to the formation at said third position of threads on the exterior surface of said combination of fiber layers and resin.

3. The invention defined in claim 1 in which said first mentioned plurality of glass fibers is applied in parallel to the outer surface of a tubular body of partially cured resin.

4. The method of making reinforced plastic pipe of substantially any desired length comprising the steps of:
   forming a length of resinous material in a tubular shape;
   continuously moving the resinous tube thus formed past a position for application thereto of a first roving of glass fibers;
   applying a first roving of glass fibers to said tube at said first position by applying to said tube a plurality of elongate glass fibers arranged in parallel and encompassing said tube;
   moving the combination of said resinous tube and said first roving past a position for application of a second roving;
   applying a second roving over said first roving at said second position by winding at least one glass fiber strand over said first roving substantially at right angles thereto;
   forming another length of resinous material having tubular form integrally with and extending from one end of said first mentioned resinous tube;
   moving said second mentioned tube of resin past said first and second positions and continuing application of said first and second roving at said points respectively;
   applying a bonding resin to said glass fibers and strands;
   rearranging the exterior layer of glass fibers in predetermined spaced relation to cause such fibers to form a continuous thread-shaped impression;

and causing said resin to solidify by the application of heat to the combination of said resinous tubes and said first and second rovings simultaneously at said first and second positions.

5. The invention in claim 4 together with the additional steps of:
moving the combination of said tubes of resin and said first and second roving past a third position prior to solidification of said resin.

6. The invention defined in claim 5 including the steps of:
applying additional rovings over said second roving prior to impression of said threads and in the manner of the application of first and second rovings;
and applying bonding resin to said additional rovings prior to the impression of threads to the exterior of the combined structure.

References Cited

UNITED STATES PATENTS

| | | | |
|---|---|---|---|
| 3,202,560 | 8/1965 | Michael | 156—289 X |
| 3,002,534 | 10/1961 | Noland | 138—145 X |
| 3,068,134 | 12/1962 | Cilker et al. | 156—177 X |
| 3,112,234 | 11/1963 | Krupp | 156—180 X |
| 2,928,764 | 3/1960 | Magoon | 156—173 X |
| 2,723,705 | 11/1955 | Collins | 156—177 |
| 2,941,915 | 6/1960 | Manning | 156—173 XR |
| 2,751,237 | 6/1956 | Conley | 156—173 XR |
| 2,583,026 | 1/1952 | Swift | 264—174 XR |

EARL M. BERGERT, *Primary Examiner.*

PHILIP DIER, *Assistant Examiner.*